No. 839,113. PATENTED DEC. 25, 1906.
W. B. CHURCHER.
ELECTRICAL CONVERTER.
APPLICATION FILED JUNE 29, 1903.
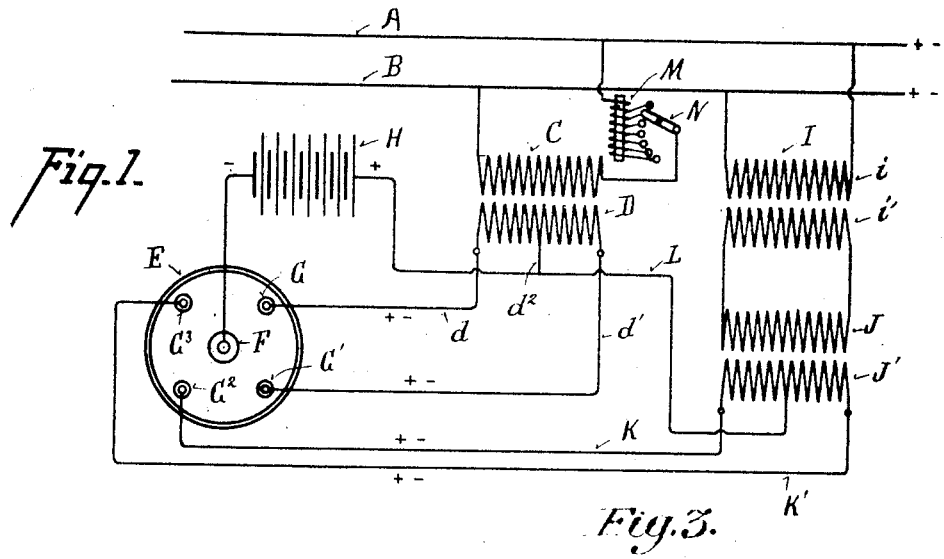
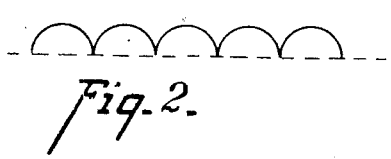
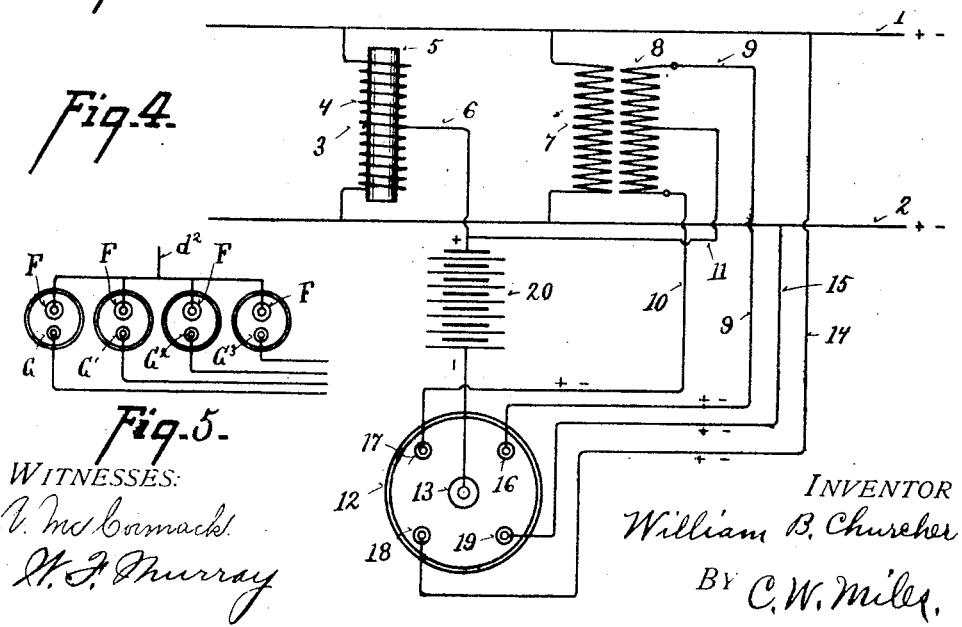
WITNESSES:
INVENTOR
William B. Churcher
BY C. W. Miles,
Attorney

UNITED STATES PATENT OFFICE.

WILLIAM B. CHURCHER, OF CINCINNATI, OHIO, ASSIGNOR TO KENNON DUNHAM, OF CINCINNATI, OHIO.

ELECTRICAL CONVERTER.

No. 889,118.

Specification of Letters Patent.

Patented Dec. 25, 1908.

Application filed June 20, 1908. Serial No. 103,543.

*To all whom it may concern:*

Be it known that I, WILLIAM B. CHURCHER, a citizen of the United States, residing at Cincinnati, in the county of Hamilton and State of Ohio, have invented certain new and useful Improvements in Electrical Converters; and I do hereby declare the following to be a full, clear, and exact description of the invention, such as will enable others skilled in the art to which it appertains to make and use the same.

My invention relates to improvements in apparatus for converting alternating into direct currents.

One of its objects is to convert alternating currents of low voltage into direct currents.

Another object is to convert an alternating current into a steady and continuous direct current.

Another object is to produce from an alternating current a direct current having at all phases of the alternating current a high minimum potential.

Another object is to convert an alternating current into a direct current by the use of a single electrolytic cell.

It also consists in certain details of combination and arrangement, all of which will be more fully set forth in the description of the accompanying drawings, in which—

Figure 1 represents a diagram of my improved apparatus. Figs. 2 and 3 are diagrams of the direct current produced. Fig. 4 represents a diagram of a modification of the apparatus. Fig. 5 represents a modified arrangement of the electrolytic cell.

Referring to Figs. 1, 2, and 3, A B represent the alternating-current supply or line-wires. C represents the primary of a transformer, and D the secondary thereof, having the end terminals $d$ $d'$ and a line $d^2$ electrically connected at a point near the center of said secondary coil. E represents an electrolytic cell containing a suitable electrolyte, such as potassium phosphate. F represents an electrode of carbon, platinum, or other inert material, and G G' are electrodes of an electrically active material, such as aluminium. H represents a storage battery, for which a motor or other consumer of the direct current may be substituted.

The parts heretofore enumerated when connected as shown in Fig. 1 serve to produce a direct current of the character indicated by the diagram Fig. 2.

In order to produce a direct current of the character indicated in Fig. 3, I also employ the transformer I, having primary $i$ and secondary $i'$, the current from which goes to primary J, which energizes the secondary J', which has terminal lines K K' connecting it with electrodes $G^2$ $G^3$, also of aluminium, and preferably located in the same cell as the electrodes heretofore referred to. L represents a line connecting the storage battery with a point near the center of the secondary J'.

The mode of operation is as follows: When the secondary D is used alone, the electrodes G G' alternately permit the passage of minus current only through the electrolyte and turn back or prevent the passage of the plus current, thereby creating a difference of potential always in one direction between the electrode F and the line $d^2$, causing a direct current to flow.

When both the secondaries D and J' are used, there is a difference of phase between the currents traversing said secondaries D and J', and therefore a difference of phase between the currents supplied to electrodes G G' and $G^2$ $G^3$, and the current through the battery H is of the character indicated in Fig. 3. Thus at whatever phase of the line-current one or other of the electrodes G G' $G^2$ $G^3$ is near its maximum of activity in conducting minus current to the electrode F through the electrolyte, and therefore the minimum potential between the electrode F and wires $d^2$ L is high, and the fluctuation between the minimum and maximum potential between said points is small, and therefore a steady and continuous direct current is produced. The phase difference may be greater or less than that indicated in Fig. 3. In order to produce the best results, it is desirable that the phase difference between the currents supplied by the secondaries D and J shall approximate ninety degrees.

In order to regulate or control the direct current being produced and also to prevent too great a potential between the electrodes in the cell, I provide an inductive resistance or choke-coil M and a switch N, adapted to fractionally cut out said resistance. This resistance or regulator may be provided or included in the circuit of either one or both the primaries, as desired.

In the modification Fig. 4, 1 2 represent the line-wires. 3 represents a choke-coil consisting of a coil 4, surrounding a laminated core 5. 6 represents a wire electrically connected near the center of said coil. 7 represents the primary of a transformer, and 8 the secondary thereof having the terminal wires 9 10 and a centrally-connected wire 11. 12 represents the electrolytic cell heretofore described, which has an inert electrode 13 connected through the storage battery or other consumer 20 with wires 6 and 11 by means of wire 1, while the wires 9 10 and branch wires 14 15, leading from the line-wires 1 2, are connected to the active aluminium electrodes 16, 17, 18, and 19. Where the coil 3 and branches 14 and 15 are connected to the cell, the current is of the character illustrated in Fig. 2, while the addition of the secondary 8 and its connections produces the current of the character indicated in Fig. 3.

The apparatus here illustrated and described is capable of considerable modification without departing from the principle of my invention.

In Fig. 5 I have shown a modification of the electrolytic cell in which each aluminium electrode is located in a separate cell, there being an equal number of electrodes F, having a common electrical connection.

I preferably provide means for cooling the electrolyte and maintaining it of an even temperature.

I am thus enabled with a simple and reliable apparatus to convert alternating currents into steady direct currents of high minimum potential and also to convert alternating into direct currents with a single electrolytic cell.

Having described my invention, what I claim is—.

1. In a converter, a plurality of electrodes adapted to receive a current in one direction, an electrode adapted to transmit the current so passed, and a plurality of coils respectively traversed by alternating currents of different phase.

2. In a converter in combination with an electrolytic cell adapted to pass a current in one direction, a plurality of coils traversed by alternating currents of different phase, substantially as specified.

3. In a converter, a plurality of coils each traversed by alternating currents of different phase, a plurality of electrodes adapted to receive current in one direction, said electrodes being respectively connected to the ends of said coils, an electrode adapted to transmit the current to said receiving-electrodes, and a connection therefrom to intermediate points on the respective coils, through which the direct current passes.

4. In a converter, a transmitting-electrode, a series of receiving-electrodes, and means for maintaining alternating currents of different phase in connection with the respective electrodes.

5. In a converter, a transmitting-electrode, a series of receiving-electrodes, and electrical connections supplying alternating currents of different phase to the respective electrodes.

6. In a converter, a plurality of electrodes adapted while serving as cathodes to freely receive current, and to resist the passage of current while serving as anodes; an electrode adapted to transmit current to said previously-mentioned electrodes; and electrical connections supplying alternating currents of different phase to said electrodes.

7. In a converter, an electrolytic cell having a transmitting-electrode, a plurality of receiving-electrodes adapted to receive and pass current of one polarity, a transformer, connections between the supply-electrodes and the ends of the secondary of said transformer, an intermediate connection from said secondary to the transmitting-electrode, and means for regulating the current in the primary of said transformer.

8. In a converter, an electrolytic cell having a transmitting-electrode, a plurality of receiving-electrodes adapted to receive and pass current of one polarity, a transformer, connections between the receiving-electrodes and the ends of the secondary of said transformer, an intermediate connection from said secondary to the transmitting-electrode, an inductive resistance in the primary of said transformer, and means for regulating the amount of said resistance.

9. In a converter, a plurality of electrodes adapted to receive current in one direction, an electrode adapted to transmit the current to said receiving-electrodes, a plurality of coils respectively traversed by alternating currents of different phase, and means for regulating the potential in said coils.

10. In a converter, a transmitting-electrode, a series of receiving-electrodes, electrical connections supplying alternating currents of different phase to said electrodes, and means for regulating the potential of the current at said electrodes.

In testimony whereof I have affixed my signature in presence of two witnesses.

WILLIAM B. CHURCHER.

Witnesses:
C. W. MILES,
A. McCORMACK.